United States Patent
Yan et al.

(10) Patent No.: US 7,922,806 B2
(45) Date of Patent: Apr. 12, 2011

(54) PROCESS FOR PRODUCING KAOLIN PRODUCT FOR PAPER COATING

(75) Inventors: Chunjie Yan, Wuhan (CN); Xiaoyan Zhu, Wuhan (CN); Jieyu Chen, Wuhan (CN); Shujie Hai, Wuhan (CN); Jielin Xu, Maoming (CN); Xiaoming Chen, Maoming (CN); Yizhi Cui, Maoming (CN); Weiqing Zeng, Maoming (CN)

(73) Assignees: China University of Geosciences (Wu Han), Wuhan (CN); Maoming Petrochemical Mining Co., Ltd., Maoming (CN)

( * ) Notice: Subject to any disclaimer, the term of this patent is extended or adjusted under 35 U.S.C. 154(b) by 426 days.

(21) Appl. No.: 12/221,511

(22) Filed: Aug. 3, 2008

(65) Prior Publication Data

US 2009/0050021 A1 Feb. 26, 2009

(30) Foreign Application Priority Data

Aug. 24, 2007 (CN) .......................... 2007 1 0053034

(51) Int. Cl.
C04B 14/04 (2006.01)
(52) U.S. Cl. ...................... 106/484; 106/427
(58) Field of Classification Search .................. 106/484
See application file for complete search history.

(56) References Cited

U.S. PATENT DOCUMENTS

| | | | | |
|---|---|---|---|---|
| 3,567,474 A | * | 3/1971 | Malden | 106/488 |
| 3,597,251 A | * | 8/1971 | Kaufman | 106/427 |
| 3,737,333 A | | 6/1973 | Sawyer, Jr. | |
| 6,468,343 B1 | | 10/2002 | Pruett et al. | |
| 2006/0086289 A1 | * | 4/2006 | Mathur et al. | 106/484 |

FOREIGN PATENT DOCUMENTS

| | | | |
|---|---|---|---|
| CN | 1315601 A | | 10/2001 |
| CN | 1332038 A | * | 1/2002 |
| CN | 1528979 A | | 9/2004 |
| CN | 101239340 A | * | 8/2008 |
| CN | 201127914 Y | * | 10/2008 |
| RU | 2263152 C1 | * | 10/2005 |

* cited by examiner

Primary Examiner — Jerry Lorengo
Assistant Examiner — Ross J Christie
(74) Attorney, Agent, or Firm — Yi Li

(57) ABSTRACT

A process of producing a kaolin product for paper coating includes mining kaolin ores by hydromechanization and then producing kaolin slurry; classifying by centrifugal sedimentation; chemical bleaching; eliminating iron ions by circular rinsing; removing water by pressure filtration; producing slurry by dispersing filter cakes, in which complex dispersants, pH adjustor and intercalator are added; delaminating; classifying by vibrating sieve; and spray drying: spray driers are restructured by adding insulating layers on packing auger, elevator scoop and bunker at first; the kaolin slurry J which has passed through vibrating sieves is dried in high speed centrifugal spray drying tower and the moisture of kaolin powder is controlled in 3 wt. %-5 wt. %, and the kaolin product for paper coating is obtained. The process characterizes in stable properties, high efficiency, and high viscosity content and fine particle size of the kaolin products produced.

2 Claims, 1 Drawing Sheet

PROCESS FOR PRODUCING KAOLIN PRODUCT FOR PAPER COATING

CROSS REFERENCE TO RELATED APPLICATION

This application claims foreign priority benefits under 35 USC §119(a)-(d) or §365(b) of Chinese Patent Application No. 200710053034.7, filed Aug. 24, 2007, which is hereby incorporated by reference in its entirety.

FIELD OF THE INVENTION

The present invention relates to a process for producing a kaolin product which is especially suitable for paper coating.

BACKGROUND OF THE INVENTION

With the development of modern technique for making paper and the faster speed to coat paper, the requirements for kaolin used in coating paper become stricter. For example, the whiteness should be above 87%; layer structures be maintained; pH value be about 6-7; the particle size distribution (PSD) be as follows: the content of particles of less than 5 μm is 100%, the content of particles of less than 2 μm is 98%, the content of particles of less than 1 μm is more than 90%, and the average particle size is less than 0.5 μm; and the viscosity content is more than 70%. The viscosity contents of the kaolin products produced by the KCS Company of U.S, the Alphacote Company of U.S and the Amazon 88 of Brazil are 70%, 74.5%, and 74.4% respectively. Among these, the kaolin product of KCS for coating paper has a particle size distribution as follows: the content of particles of −3.5 μm is 100%, the content of particles of −2 μm is 99.4%, the content of particles of −0.5 μm is 92.7%; the whiteness is 84.5% and pH value is 7.5. While, in China, the viscosity contents of the kaolin products applied for coating paper are mostly about from 66% to 70% due to the formation of mineral ores and producing technologies (the value of viscosity content are typically used in kaolin industry to measure a concentration, it is specified as a percentage value when the viscosity is 500 mPa·s, and the higher the value, the lower the viscosity). The particle size distribution is not proper and whiteness of kaolin products is emphasized excessively. Hence, China imports a great amount of high quality kaolin products for paper coating from U.S, U.K, Brazil and other countries in the globe every year. The kaolin resources are extremely abundant in China, but most of them can not be applied in the paper coating directly. The problems, within which the viscosity content is the most difficult one to be solved, become the bottle-neck of the production and application of Chinese kaolin and must be addressed urgently.

Kaolin with a minimum formula of $Al_4(Si_4O_{10})(OH)_8$, is a 1:1 type dioctahedral aluminosilicate comprising a sheet of aluminum atoms coordinated octahedrally with apical oxygen atoms and hydroxyls and another sheet of silicon atoms coordinated tetrahedrally to oxygen, which are coordinated with the same oxygen. One side of the layer structure of kaolin is strong polar hydroxyls and the other side is oxygen atoms. As we know, there are no electrons circling round the hydrionic nucleus and oxygen is a strong electronegative atom, so it is easy to form the hydrogen bond between two sheets, so that kaolin is hardly dispersed.

Rheological behavior of kaolin suspensions has been one of the major factors determining the potential usage of kaolin in the paper industry. Previous studies have indicated three methods to reducing the viscosity of the kaolin slurry.

(1) Mechanical Extrusion

Some researches reduce the viscosity of the kaolin products through changing the particle size, shape and the distribution by milling the kaolin slurry with medium such as zirconia spheres, resin spheres or the like.

China Patent CN1315601A provides a method to reduce the viscosity of the kaolin slurry. The crude ores are purified, and then mixed with water and the clay has a solid content of about 60%-85%; the slurry is placed into an equipment with the functions of kneading and extrusion; the slurry is kneaded and extruded for 10-60 minutes; and then the product is obtained. The viscosity content is improved from 50%-65% of raw ores to more than 68%.

The products treated with that kind of method are affected by the quality of ores greatly and can not eliminate the interferences of the impurities. The limited enhancements confine the application of the methods.

(2) Use of Chemical Additives to Reduce Viscosity

At present, this kind of method is most common and prevailing. Some chemical agents such as sodium silicate, sodium polyacrylate and sodium hexametaphosphate combining with the method to adjust the pH value of slurry are usually used as dispersants to reduce the viscosity and some other new surface active agents are tried also. China patent CN1528979A provides a process to reduce the viscosity and improve the whiteness of the kaolin for paper coating, wherein the slurry is treated by high-gradient magnetic separation, and then chemical bleaching and surface modification. The chemical bleaching is performed under the following conditions: sulfuric acid 1.7-1.9 kg/t, sodium dithionite (also known as sodium hydrosulfite) 6.2-6.6 kg/t, bleaching time 10-20 minutes; sodium polyacrylate (the agent for surface modification) 1.4-1.6 kg/t. This process of that patent mainly emphasizes on how to apply the methods such as the high-gradient magnetic separation and chemical bleaching to improve the whiteness of the kaolin. The reduction of the viscosity of the kaolin products just lies on the chemical agent, sodium polyacrylate, so this method has great limitation. In view of the physical indexes of kaolin products, the viscosity content varies within the great range of 70%-72%. As we know, it is significant on the paper coating even just a variation of about 1%.

The defects of this method is that kaolin ores from different areas require different dispersants to achieve the optimum effect, but there are too many kinds of surface active agents, so it is needed to do plenty of experiments to verify the results. Furthermore, it is difficult to improve the viscosity of the products even at the optimal factors.

(3) Modification of Kaolin Powder

The surface electric property, surface absorption and soakage of kaolin can be changed by physical and chemical methods and the experiments are operated according to the layered structure of kaolin and the properties of structural functional groups of —Si(Al)—OH, —Si—O—Al— and —Si(Al)—O. These kinds of researches are few and generally, the viscosity content of kaolin is reduced by modifying surfaces of kaolin using surface active agents and thus reducing surface energy.

In general, perfect and universally applicable techniques about the viscosity of kaolin have not established until now. Most of researches on the viscosity of kaolin stay at the stage of the theoretical study in addition that the mechanical methods and methods in which dispersants are added are capable of reducing the viscosity of kaolin to some extent.

To control the particle size of kaolin mainly depends on the equipments including mechanical milling besides the hydro cyclones and horizontal spiral classifiers.

SUMMARY OF THE INVENTION

The object of the present invention is to provide a high efficient process for producing a kaolin product for paper coating with high viscosity content and fine particle size.

In order to achieve the above object of the present invention, the process of the present invention comprises the following steps:

(a) mining kaolin ores by hydromechanization and then producing kaolin slurry;

(b) classifying by centrifugal sedimentation, wherein the slurry obtained from the former step is classified with a horizontal spiral sedimentation machine;

(c) chemical bleaching, wherein the kaolin slurry classified by centrifugal sedimentation is bleached;

(d) eliminating iron ions by circular rinsing, wherein the kaolin slurry is washed by circular rinsing and dewatered to remove the ferrous ions and ferric complex and then slurry G is obtained;

(e) removing water by pressure filtration, wherein the kaolin slurry G is filtered under pressure and filter cakes, which contains 32 wt. %-35 wt. % water and have a pH value of 4.3-5.9, fall into a dispersing pond;

(f) producing slurry by deflocculating (filter cakes are treated by chemical agents after they are dewatered), wherein complex dispersants, pH adjusting agent and intercalator are added into the filter cakes; wherein the complex dispersants are sodium hexametaphosphate and sodium polyacrylate, the pH adjusting agent is sodium hydroxide and the intercalator is urea; wherein the sodium polyacrylate has a molecular weight of about 1300-2000, and is added in 1 wt. %-3 wt. % of the dry weight of the filter cakes; the sodium hexametaphosphate is added in 2 wt. %-3 wt. % of the dry weight of the filter cakes; the sodium hydroxide is added in 3 wt. %-4.5 wt. % of the dry weight of the filter cakes; and the urea is added in 2 wt. %-6 wt. % of the dry weight of the filter cakes; and the kaolin slurry is stirred and dispersed to obtain kaolin slurry H whose solid content is 56 wt. %-62 wt. % and pH value is adjusted to 6.3-7.0;

(g) delaminating, wherein the slurry H is added into vertical agitated mills containing a particulate grinding medium, to obtain kaolin slurry I whose solid content is 56 wt. %-62 wt. %;

(h) classifying by vibrating sieve, wherein the kaolin slurry I passes through two layers of 325-mesh vibrating sieves to obtain kaolin slurry J; and (i) spray drying, wherein spray driers are restructured by adding insulating layers on packing auger, elevator scoop and bunker at first (intercalating urea into the layers of kaolin by the waste heat of the spray drier); wherein the kaolin slurry J which has passed through vibrating sieves is dried in high speed centrifugal spray drying tower, where the parameter of fresh feed pump is 3.5-4.0 Hz, the temperatures of spray drying of the high speed centrifugal spray drying tower (or the temperature of the inlet) and the outlet of the spray drier are set to 230-380° C. and 60-85° C. respectively and the moisture of kaolin powder is controlled in 3 wt. %-5 wt. %; and the intercalation reaction in the kaolin slurry is performed in the process that the powder passes through the packing auger, the elevator scoop and the bunker to obtain the kaolin product for paper coating finally after the intercalation reaction.

The particulate grinding medium is ceramic spheres, glass beads, synthetic corundum spheres or nylonpolyethylene spheres.

In the said step (a), the kaolin ores are mined by hydromechanization and the solid content of slurry is about 6 wt. %-10 wt. %. The sands is removed after the slurry at the mine site pass through the spiral classifier and three-stage hydrocyclones, then kaolin slurry A is obtained and transferred into storage pool. Some dispersants like sodium hexametaphosphate e.g. in 1-2 kg/t and sodium silicate e.g. in 0.8-1.2 kg/t, based on the weight of the kaolin slurry A, are added to the slurry A to obtain kaolin slurry B. The kaolin slurry B goes through the hydrocyclones to obtain kaolin slurry C whose content of sands is reduced to less than 0.05% and the tailings are thrown away. The kaolin slurry C is deposited for a period of time to reach 13 wt. %-19 wt. % to obtain kaolin slurry D.

In said step (b), the kaolin slurry D obtained from the former step is classified with the horizontal spiral sedimentation machine with the rotate speed of 3700-3900 r/min and the separating parameter of 3000-3800. The bottom flow is used for other applications and the overflow is kaolin slurry E.

In said step (c), the kaolin slurry E flows into an octagonal pool and is stirred by an agitator. Sulfuric acid, sodium dithionite (also known as sodium hydrosulfite, $Na_2S_2O_4$) and phosphoric acid are added into the kaolin slurry E in the octagonal pool. The addition amount of sulfuric acid, sodium dithionite and phosphoric acid are 2-7 kg/t, 6-8 kg/t and 2-5 kg/t respectively, based on the weight of the kaolin slurry E, and pH value of the kaolin slurry E is adjusted to about 2-4. The kaolin slurry E is bleached for 10-25 minutes and kaolin slurry F is obtained.

The ferric irons ($Fe^{3+}$) are removed from the kaolin by chemical bleaching with the methods of acid dipping, reduction and complexation. The ferric irons ($Fe^{3+}$) in the kaolin are reduced to ferrous irons ($Fe^{2+}$) by sulfuric acid and sodium dithionite under the chemical bleaching reaction (reduction reaction). In order to prevent the reversion that the ferrous irons are re-oxidized to ferric irons and the phenomenon that the slurry is reversed from white to yellow, phosphoric acid is used to complex the ferric ions and the whiteness of the kaolin is improved by washing the complex out from the slurry. The additions of the sulfuric acid and sodium dithionite are determined by the ferric ions content of the kaolin according to the reaction formula. The reaction formula is as follows:

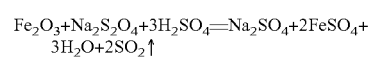

$$Fe_2O_3 + Na_2S_2O_4 + 3H_2SO_4 = Na_2SO_4 + 2FeSO_4 + 3H_2O + 2SO_2\uparrow$$

The viscosity content of the kaolin product reaches 72%-73.89% and the content of the particles of −2 μm can be improved by 1.1%-4.2%, and the content of particles of −1.5 μm can be improved by about 0.8%-7.5%.

The characteristics of the present invention includes following aspects.

(1) The urea used as an intercalator

The intercalation of kaolin improves the solid content, enhances the efficiency and is beneficial to the delamination of kaolin planer. The products produced by the process of the present invention characterizes in high viscosity content, fine particle size and good effect of granulating.

(2) The time choice of adding the intercalator (urea)

The first reason for the time choice that the urea is added into the dispersing pool is that the addition amount of urea can be metered accurately. The weight of dry kaolin powders of the filter cakes in each pressure filter during the step (f) "producing slurry by deflocculating" is 1 ton (meaning that the weight of the filter cakes in each pressure filter is fixed) and the addition amount of urea is 2%-6% of the weight of the dry powder of the filter cakes, so the metering is very precise. The kaolin exists as flowing slurry during other steps in the whole process and the solid content of the slurry varies usually, so it is not easy to meter the added urea. Furthermore, urea can be added into the dispersing pool with other dispersants and pH adjustor without any other operations such as mechanical fragmentation and urea is resolved after stirred in the pool, so the addition of urea does not affect the next operation. Thirdly, when the filter cakes have been dispersed in the pool, the solid contents of slurry just could be modulated to 51 wt. %-55 wt. % when it is just combined with the dispersants and pH adjustor to assure that the viscosity is in the range of 50-80 mPa·s which is needed at the next step (g) "delaminating", while in the present invention the solid content of slurry can be modulated to 56 wt. %-62 wt. % to assure that its viscosity is in that range when urea is added into the slurry.

(3) The increase on solid contents of slurry would enhance the effect of delamination in next step. The content of fine particles of −2 μm increases by 1.1 wt. %-4.2 wt. % and the contents of particles of −1.5 μm increases by 0.8 wt. %-7.5 wt. %. Furthermore, the efficiency of the production of kaolin could be improved.

(4) The effect of granulation of kaolin is outstanding and the products are not easy to dust and cause the pollution during the application of it. In the high-speed centrifugal spray drying equipment, the slurry is dried instantaneously under the condition of the heat applied by a furnace. Due to the addition of urea, the effect of granulation of spray-dried powder is outstanding. During the process of the application, the powders with better granulation do not throw dirt; thus do not pollute the working condition and do not impact on the health of workers during the process of powders.

(5) The intercalation reaction is assured by the usage of waste heat of high-speed centrifugal spray drying equipment and water control. In the present invention, the spray drying equipments are reconstituted. The powder goes through the packing auger, the elevator scoop and the bunker from the outlet of the spray drying equipment. The passage provided with temperature, time and water necessary for intercalation of urea. Because the intercalation of urea into kaolin need a certain temperature, the insulating layers on the packing auger, the elevator scoop and the bunker are thicken, so that the waste heat of spray drying, which is sufficient to meet the needs of the temperature of intercalation, is consumed. Furthermore, the reaction of intercalation has requirements for water and reacting time, so water and temperature are necessarily controlled in the spray drying tower and the intercalation reaction time is ensured by delaying the loading time in the present invention.

(6) The viscosity content of the kaolin product for paper coating can be improved from 68%-70% to 72%-73.89% and the performances of the product are stable. The viscosity content of the kaolin produced by the previous technique is just 68%-70%, while that of the kaolin produced by the intercalation achieves 72%-73.89%. This outcomes would not be achieved even the kaolin and urea with the same contents are simply mixed together. The viscosity content of all products in the present invention is more than 72% in the production tests.

(7) The pH value of the products is improved. The pH of the dispersed slurry is modified to 6.3-7.0 in the present invention, so that the pH value of the products are improved from 5.0-6.5 to 6.8-7.4 and the products are very easily dispersed. The pH value of the kaolin produced by the previous technique is 5.0-6.5 and now pH of the products achieves 6.8-7.4. According to the characteristic that kaolin is more easily dispersed in alkaline conditions, we know these kaolin products are more easily dispersed.

(8) The added agents do not affect the coating performance of the products. In the process of coating paper, some urea would be added into the coating colors sometimes in order to improve the properties of the coating colors, so the intercalator (urea) applied does not affect the performance of the colors for paper coating The advantages of the present invention are in the following aspects. (1) The viscosity content of the kaolin product for paper coating is enhanced from 68%-70% to 72%-73.89% and the performances are stable. (2) The contents of particles of −2 μm and particles of −1.5 μm in the kaolin product for paper coating are improved by 1.1%-4.2%, and by 0.8%-7.5% respectively and the particle size is fine. (3) The pH value of the products is enhanced from 5.0-6.5 to 6.8-7.4, which makes the kaolin disperse more easily. (4) The kaolin has perfect granulation performance and does not throw dust and not contaminate the working conditions when used. (5) During the delaminating in the process, the combination of the technology of intercalation and the method of mechanical milling can improve the efficiency of the delamination of kaolin. The addition of urea can enhance the solid content of the kaolin slurry from 51 wt. %-55 wt. % to 56 wt. %-62 wt. %. (6) The novel addition of urea has no adverse affect on the performances of the paper coated by these kaolin products.

DETAILED DESCRIPTION OF THE INVENTION

Figure 1:
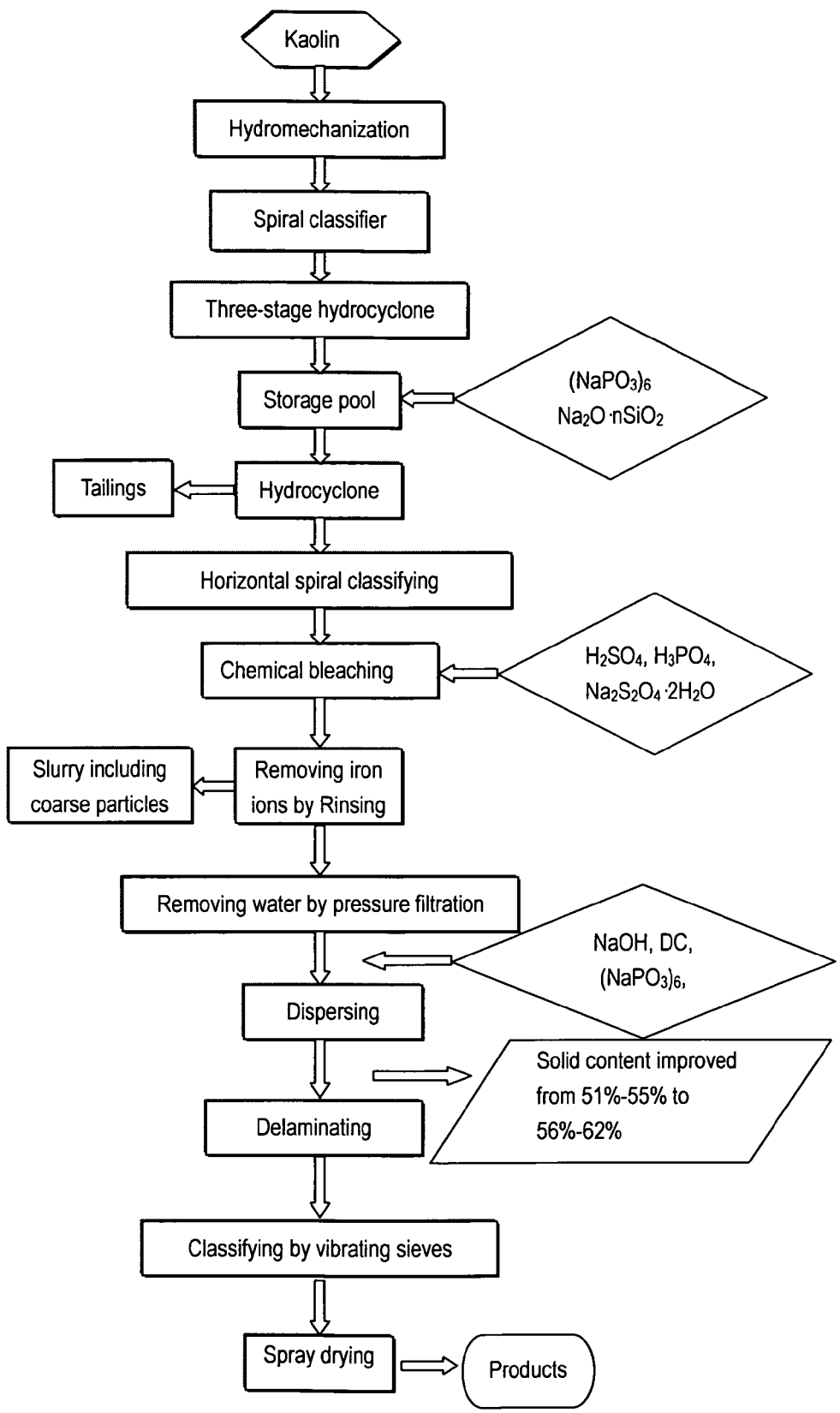
FIG. 1 is the flow chart of the process of the present invention.

In order to better comprehend the present invention, the content thereof is further described by way of the following examples. However, the scope of the present invention would not be confined in the following examples. The raw materials used in the following examples are sandy kaolin ores coming from Maoming, Guangdong province, China.

Example 1

As shown in FIG. 1, a process for producing the kaolin product for paper coating includes the following steps:

(a) The kaolin ores were mined by hydromechanization and the solid content of slurry was 6 wt. %. Kaolin slurry A was obtained when the slurry at the mine site was passed through the spiral classifier and three-stage hydrocyclones to remove the sands, and then the kaolin slurry A was transferred into storage pool. Dispersants sodium hexametaphosphate e.g. in 1 kg/t and sodium silicate e.g. in 0.8 kg/t, based on the weight of the kaolin slurry A, were added to the kaolin slurry A to obtain kaolin slurry B. The kaolin slurry B was passed through the hydrocyclones to obtain kaolin slurry C whose content of sands was reduced to less than 0.05% and the tailings were thrown away. The kaolin slurry C was deposited for a period of time to reach a concentration of 13 wt. % to obtain kaolin slurry D, which was transferred to the next step.

(b) Classifying by centrifugal sedimentation

The kaolin slurry D as transferred from the former step was classified with a horizontal spiral sedimentation machine with the rotate speed of 3700 r/min (round per minute) and the separating parameter of 3000. The bottom flow was used for other applications and the overflow was kaolin slurry E.

(c) Chemical bleaching

The kaolin slurry E was allowed to flow into an octagonal pool and stirred by an agitator. Sulfuric acid, sodium dithionite and phosphoric acid were added into the kaolin slurry E in the octagonal pool. The sulfuric acid, sodium dithionite and phosphoric acid were added in 2 kg/t, 6 kg/t and 2 kg/t respectively, based on the weight of the kaolin slurry E, and pH value of the slurry was adjusted to about 2. The bleaching was performed for 10 minutes, and kaolin slurry F was obtained.

The ferric irons ($Fe^{3+}$) were removed from the kaolin by chemical bleaching with the methods of acid dipping, reduction and complexation. The ferric irons ($Fe^{3+}$) in the kaolin were reduced to ferrous irons ($Fe^{2+}$) by sulfuric acid and sodium dithionite under the chemical bleaching reaction (reduction reaction). In order to prevent the reversion that the ferrous irons are re-oxidized to ferric irons and the phenomenon that the slurry reverses from white to yellow, phosphoric acid was applied to complex the ferric ions and the whiteness of the kaolin was improved by washing the complex out from the slurry. The additions of the sulfuric acid and sodium dithionite were determined by the ferric ions content of the kaolin according to the reaction formula as follows:

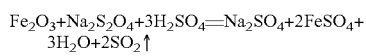

$$Fe_2O_3 + Na_2S_2O_4 + 3H_2SO_4 = Na_2SO_4 + 2FeSO_4 + 3H_2O + 2SO_2\uparrow$$

(d) Iron ions were eliminated by circular rinsing and the kaolin slurry F was washed by circular rinsing and dewatered to remove the ferrous ions and ferric complex and then kaolin slurry G was obtained;

(e) Water was removed by the pressure filtration and the kaolin slurry G was filtered and filter cakes, which contained 32 wt. % water and had a pH value of 4.3, fell into a dispersing pond;

(f) Slurry was produced by deflocculating (the filter cakes were treated by chemical agents after they were dewatered)

Complex dispersants, pH adjusting agent and intercalator were added into the filter cakes. Complex dispersants used were sodium hexametaphosphate and sodium polyacrylate. The pH adjusting agent used was sodium hydroxide and the intercalator was urea. Sodium polyacrylate with a molecular weight of about 1300 was added in 1 wt. %, sodium hexametaphosphate was added in 2 wt. %; sodium hydroxide was added in 3 wt. % and the intercalator urea, a conventional agricultural fertilizer, was added in 2 wt. % as compared to the dry weight of the filter cakes (the weight of the dry powders). The slurry was stirred and dispersed to obtain kaolin slurry H whose solid content was 56 wt. % and pH value was adjusted to 6.3.

(g) Delaminating

The kaolin slurry H was added into vertical agitated mills containing particulate grinding medium (ceramic spheres, glass beads, synthetic corundum spheres or nylonpolyethylene spheres) and then kaolin slurry I was obtained whose solid content was 56 wt. %.

(h) Classifying by vibrating sieve

The kaolin slurry I was passed through two layers of 325-mesh vibrating sieves to achieve kaolin slurry J; and (i) Spray drying Spray driers were restructured by adding insulating layers on the packing auger, the elevator scoop and the bunker at first (intercalating urea into the layers of kaolin by the waste heat of the spray drier). The kaolin slurry J which had passed through vibrating sieves was dried in high speed centrifugal spray drying tower, and the parameter of fresh feed pump was 3.5 Hz (in order to control the feed rate), the temperatures of the inlet and the outlet of the spray drier were set to 230° C. and 60° C. respectively and the moisture of kaolin powder was controlled at 3 wt. %. The intercalation reaction in the kaolin slurry was performed in the process that the powder passed through the packing auger, the elevator scoop and the bunker. The kaolin product for paper coating was obtained finally after the intercalation reaction.

The indexes of the products were analyzed (see Table 1 and Table 2).

Example 2

(a) The kaolin ores were mined by hydromechanization and the solid content of slurry was 7 wt. %. Kaolin slurry A was obtained when the slurry at the mine site was passed through the spiral classifier and three-stage hydrocyclones to remove the sands and then kaolin slurry A was transferred into storage pool. Dispersants sodium hexametaphosphate e.g. in 1.5 kg/t and sodium silicate e.g. in 1.0 kg/t, based on the weight of the kaolin slurry A, were added to the kaolin slurry A to obtain kaolin slurry B. The kaolin slurry B was passed through the hydrocyclones to obtain kaolin slurry C whose content of sands was reduced to less than 0.05% and the tailings were thrown away. The kaolin slurry C was deposited for a period of time to reach a concentration of 14 wt. % to obtain kaolin slurry D, which was transferred to the next step.

(b) Classifying by centrifugal sedimentation

The kaolin slurry D as transferred from the former step was classified with a horizontal spiral sedimentation machine with the rotate speed of 3800 r/min and the separating parameter of 3200. The bottom flow was used for other applications and the overflow was kaolin slurry E.

(c) Chemical bleaching

The kaolin slurry E was allowed to flow into an octagonal pool and stirred by an agitator. Sulfuric acid, sodium dithionite and phosphoric acid were added into the slurry E in the octagonal pool. The sulfuric acid, sodium dithionite and phosphoric acid were added in 3.5 kg/t, 6 kg/t and 2.3 kg/t respectively, based on the weight of the kaolin slurry E, and pH value of the slurry was adjusted to about 3. The bleaching was performed for 15 minutes, and kaolin slurry F was obtained.

(d) Iron ions were eliminated by circular rinsing and the kaolin slurry F was washed by circular rinsing and dewatered to remove the ferrous ions and ferric complex and then kaolin slurry G was obtained.

(e) Water was removed by the pressure filtration and the kaolin slurry G was filtered and filter cakes, which contained 33 wt. % water and had a pH value of 5.0, fell into a dispersing pond.

(f) Slurry was produced by deflocculating (the filter cakes were treated by chemical agents after they were dewatered)

Complex dispersants, pH adjusting agent and intercalator were added into the filter cakes. Complex dispersants used were sodium hexametaphosphate and sodium polyacrylate. The pH adjusting agent used was sodium hydroxide and the intercalator was urea. Sodium polyacrylate with a molecular weight of about 1500 was added in 1 wt. %, sodium hexametaphosphate was added in 2.5 wt. %; sodium hydroxide was added in 3 wt. % and the intercalator urea, a conventional agricultural fertilizer, was added in 2 wt. % as compared to the dry weight of the filter cakes (the weight of the dry powders). The slurry was stirred and dispersed to obtain kaolin slurry H whose solid content was 58 wt. % and pH value was adjusted to 6.5.

(g) Delaminating,

The kaolin slurry H was added into vertical agitated mills containing a particulate grinding medium (ceramic spheres, glass beads, synthetic corundum spheres or nylonpolyethylene spheres) and then kaolin slurry I was obtained whose solid content was 56 wt. %.

(h) Classifying by vibrating sieve

The kaolin slurry I was passed through two layers of 325-mesh vibrating sieves to achieve kaolin slurry J.

(i) Spay drying

Spray driers were restructured by adding insulating layers on the packing auger, the elevator scoop and the bunker at first (intercalating urea into the layers of kaolin by the waste heat of the spray drier). The kaolin slurry J which had passed through vibrating sieves was dried in high speed centrifugal spray drying tower, and the parameter of fresh feed pump was 3.8 Hz, the temperatures of the inlet and the outlet of the spray drier were set to 258° C. and 65° C. respectively and the moisture of kaolin powder was controlled at 4 wt. %. The intercalation reaction in the kaolin slurry performs was performed in the process that the powder passed through the packing auger, the elevator scoop and the bunker. The kaolin product for paper coating was obtained finally after the intercalation reaction.

The indexes of the product were analyzed (see Table 1 and Table 2).

Example 3

The process for producing the kaolin product for paper coating included the following steps:

(a) The kaolin ores were mined by hydromechanization and the solid content of slurry was 7 wt. %. Kaolin slurry A was obtained when the slurry at the mine site was passed through the spiral classifier and three-stage hydrocyclones to remove the sands and then the kaolin slurry A was transferred into storage pool. Dispersants sodium hexametaphosphate e.g. in 1.5 kg/t and sodium silicate e.g. in 1.02 kg/t, based on the weight of the kaolin slurry A were added to the kaolin slurry A to obtain kaolin slurry B. The kaolin slurry B was passed through the hydrocyclones to obtain kaolin slurry C whose content of sands was reduced to less than 0.05% and the tailings were thrown away. The kaolin slurry C was deposited for a period of time to reach a concentration of 15 wt. % to obtain kaolin slurry D, which was transferred to the next step.

(b) Classifying by centrifugal sedimentation

The kaolin slurry D as transferred from the former step was classified with a horizontal spiral sedimentation machine with the rotate speed of 3800 r/min and the separating parameter of 3500. The bottom flow was used for other applications and the overflow was kaolin slurry E.

(c) Chemical bleaching

The kaolin slurry E was allowed to flow into an octagonal pool and stirred by an agitator. Sulfuric acid, sodium dithionite and phosphoric acid were added into the kaolin slurry E in the octagonal pool. The sulfuric acid, sodium dithionite and phosphorous acid were added in 5 kg/t, 7 kg/t and 3.4 kg/t respectively, based on the weight of the kaolin slurry E, and pH value of the kaolin slurry was adjusted to about 3. The bleaching was performed for 15 minutes, and kaolin slurry F was obtained.

(d) Iron ions were eliminated by circular rinsing and the kaolin slurry F was washed by circular rinsing and dewatered to remove the ferrous ions and ferric complex and then kaolin slurry G was obtained.

(e) Water was removed by the pressure filtration and the kaolin slurry G was filtered and filter cakes, which contained 33 wt. % water and pH value was 5.0, fell into a dispersing pond.

(f) Slurry was produced by deflocculating (the filter cakes were treated by chemical agents after they were dewatered)

Complex dispersants, pH adjusting agent and intercalator were added into the filter cakes. Complex dispersants used were sodium hexametaphosphate and sodium polyacrylate. The pH adjusting agent used was sodium hydroxide and the intercalator was urea. Sodium polyacrylate with a molecular weight of about 1500 was added in 1 wt. %, sodium hexametaphosphate was added in 2.5 wt. %; sodium hydroxide was added in 3 wt. % and the intercalator urea, a conventional agricultural fertilizer, was added in 5 wt. % as compared to the dry weight of the filter cakes (the weight of the dry powders). The slurry was stirred and dispersed to obtain kaolin slurry H whose solid content was 59 wt. % and pH value was adjusted to 6.5.

(g) Delaminating

The kaolin slurry H was added into vertical agitated mills containing a particulate grinding medium (ceramic spheres, glass beads, synthetic corundum spheres or nylonpolyethylene spheres) and then kaolin slurry I was obtained whose solid content was 56 wt. %.

(h) Classifying by vibrating sieve

The kaolin slurry I was passed through two layers of 325-mesh vibrating sieves to achieve kaolin slurry J.

(i) Spay drying

Spray driers were restructured by adding insulating layers on the packing auger, the elevator scoop and the bunker at first (intercalating urea into the layers of kaolin by the waste heat of the spray drier). The kaolin slurry J which had passed through vibrating sieves was dried in high speed centrifugal spray drying tower, and the parameter of fresh feed pump was 3.8 Hz, the temperatures of the inlet and the outlet of the spray drier were set to 370° C. and 70° C. respectively and the moisture of kaolin powder was controlled at 5 wt. %. The intercalation reaction in the kaolin slurry was performed in the process that the powder passed through the packing auger, the elevator scoop and the bunker. The kaolin product for paper coating was obtained finally after the intercalation reaction.

The indexes of the product were analyzed (see Table 1 and Table 2).

Example 4

The process for producing the kaolin product for paper coating included the following steps:

(a) The kaolin ores were mined by hydromechanization and the solid content of slurry was 10 wt. %. Kaolin slurry A was obtained when the slurry at the mine site was passed through the spiral classifier and three-stage hydrocyclones to remove the sands and then the kaolin slurry A was transferred into storage pool. Dispersants sodium hexametaphosphate e.g. in 2 kg/t and sodium silicate e.g. in 1.2 kg/t, based on the weight of the kaolin slurry A, were added to the kaolin slurry A to obtain kaolin slurry B. The kaolin slurry B was passed through the hydrocyclones to obtain kaolin slurry C whose content of sands was reduced to less than 0.05% and the tailings were thrown away. The kaolin slurry C was deposited for a period of time to reach a concentration of 19 wt. % to obtain kaolin slurry D.

(b) Classifying by centrifugal sedimentation

The kaolin slurry D as transferred from the former step was classified with a horizontal spiral sedimentation machine with the rotate speed of 3900 r/min and the separating parameter of 3800. The bottom flow was used for other applications and the overflow was kaolin slurry E.

(c) Chemical bleaching

The kaolin slurry E was allowed to flow into an octagonal pool and stirred by an agitator. Sulfuric acid, sodium dithionite and phosphoric acid were added into the slurry E in the octagonal pool. The sulfuric acid, sodium dithionite and phosphorous acid were added in 7 kg/t, 8 kg/t and 5 kg/t respectively, based on the weight of the kaolin slurry E, and pH value of the slurry was adjusted to about 4. The bleaching was performed for 25 minutes, and kaolin slurry F was obtained.

(d) Iron ions were eliminated by circular rinsing and the kaolin slurry F was washed by circular rinsing and dewatered to remove the ferrous ions and ferric complex and then kaolin slurry G was obtained.

(e) Water was removed by the pressure filtration and the kaolin slurry G was filtered and filter cakes, which contained 35 wt. % water and pH value was 5.9, fell into a dispersing pond.

(f) Slurry was produced by deflocculating (the filter cakes were treated by chemical agents after they were dewatered)

Complex dispersants, pH adjusting agent and intercalator were added into the filter cakes. Complex dispersants used were sodium hexametaphosphate and sodium polyacrylate. The pH adjusting agent used was sodium hydroxide and the intercalator was urea. Sodium polyacrylate with a molecular weight of about 2000 was added in 3 wt. %, sodium hexametaphosphate was added in 3 wt. %; sodium hydroxide was added in 4.5 wt. % and the intercalator urea, a conventional agricultural fertilizer, was added in 6 wt. % as compared to the dry weight of the filter cakes (the weight of the dry powders). The slurry was stirred and dispersed to obtain kaolin slurry H whose solid content was 62 wt. % and pH value was adjusted to 6.5.

(g) Delaminating

The kaolin slurry H was added into vertical agitated mills containing a particulate grinding medium (ceramic spheres, glass beads, synthetic corundum spheres or nylonpolyethylene spheres and then kaolin slurry I was obtained whose solid content was 62 wt. %.

(h) Classifying by vibrating sieve

The slurry I was passed through two layers of 325-mesh vibrating sieves to achieve kaolin slurry J.

(i) Spay drying

Spray driers were restructured by adding insulating layers on the packing auger, the elevator scoop and the bunker at first (intercalating urea into the layers of kaolin by the waste heat of the spray drier). The kaolin slurry J which had passed through vibrating sieves was dried in high speed centrifugal spray drying tower, and the parameter of fresh feed pump was 4.0 Hz, the temperatures of the inlet and the outlet of the spray drier were set to 380° C. and 85° C. respectively and the moisture of kaolin powder was controlled at 5 wt. %. The intercalation reaction in the kaolin slurry was performed intercalation reaction in the process that the powder passed through the packing auger, the elevator scoop and the bunker. The kaolin product for paper coating was obtained finally after the intercalation reaction.

The indexes of the products were analyzed (see Table 1 and Table 2).

TABLE 1

The analysis of indexes of the products

| Sample number | Whiteness/% | The content of particles of −2 μm/% | Moisture/% | Sand (mesh residue)/% | pH value | Viscosity content/% |
|---|---|---|---|---|---|---|
| Products produced by traditional technique | 87 | 94.8 | 1.3 | 0.003 | 6.34 | 69 |
| Example 1 | 86.6 | 96.5 | 3.4 | 0.005 | 7.01 | 73.3 |
| Example 2 | 86.5 | 95.9 | 4.8 | 0.005 | 7.40 | 72.33 |
| Example 3 | 86.8 | 99.0 | 1.8 | 0.006 | 7.18 | 72.99 |
| Example 4 | 86 | 96.0 | 4.4 | 0.005 | 7.13 | 73.89 |

TABLE 2

Particle size distribution of the products (particle size, μm; content, %)

| Sample number | 5.000 | 4.250 | 3.500 | 3.000 | 2.500 | 2.000 | 1.500 | 1.000 | 0.500 |
|---|---|---|---|---|---|---|---|---|---|
| Products by traditional technique | 100.0 | 100.0 | 99.9 | 99.5 | 97.9 | 94.8 | 90.2 | 81.8 | 81.8 |
| Example 1 | | 100.0 | 99.8 | 98.8 | 96.5 | 91.6 | 83.4 | 83.4 | |
| Example 2 | | 100.0 | 99.7 | 98.1 | 95.9 | 91.0 | 80.8 | 80.8 | |
| Example 3 | | | 100.0 | 99.7 | 99.0 | 97.7 | 95.9 | 95.9 | |
| Example 4 | | 100.0 | 99.8 | 98.5 | 96.0 | 91.8 | 83.5 | 83.2 | |

What is claimed is:

1. A process for producing a kaolin product for paper coating comprising:
   (a) mining kaolin ores by hydromechanization and then producing kaolin slurry;
   (b) classifying by centrifugal sedimentation, wherein the kaolin slurry obtained from the former step is classified with a horizontal spiral sedimentation machine;
   (c) chemical bleaching, wherein the kaolin slurry classified by centrifugal sedimentation is bleached;
   (d) eliminating iron ions by circular rinsing, wherein the kaolin slurry is washed by circular rinsing and dewatered after it has been bleached through the chemical bleaching and then slurry G is obtained;
   (e) removing water by pressure filtration, wherein the kaolin slurry G is filtered under pressure to remove water and filter cakes, which contains 32 wt. %-35 wt. % water and has a pH value of 4.3-5.9, fall into a dispersing pond;
   (f) producing slurry by deflocculating, wherein complex dispersants, pH adjusting agent and intercalator are added into the filter cakes; wherein the complex dispersants are sodium polyacrylate and sodium hexametaphosphate, the pH adjusting agent is sodium hydroxide and the intercalator is urea; wherein the sodium polyacrylate has a molecular weight of 1300-2000, and is added in 1 wt. %-3 wt. % of the dry weight of the filter cakes; the sodium hexametaphosphate is added in 2 wt.

%-3 wt. % of the dry weight of the filter cakes; the sodium hydroxide is added in 3 wt. %-4.5 wt. % of the dry weight of the filter cakes; and the urea is added in 2 wt. %-6 wt. % of the dry weight of the filter cakes; and the kaolin slurry is stirred and dispersed to obtain kaolin slurry H whose solid content is 56 wt. %-62 wt. % and pH value is adjusted to 6.3-7.0;

(g) delaminating, wherein the kaolin slurry H is added into vertical agitated mills containing a particulate grinding medium and delaminated by stirring, to obtain kaolin slurry I whose solid content is 56 wt. %-62 wt. %;

(h) classifying by vibrating sieve, wherein the kaolin slurry I is passed through two layers of 325-mesh vibrating sieves to obtain kaolin slurry J; and (i) spay drying, wherein spray driers are modified by adding insulating layers on packing auger, elevator scoop and bunker at first; the kaolin slurry J which has been passed through vibrating sieves is dried in high speed centrifugal spray drying tower where the parameter of fresh feed pump is 3.5-4.0 Hz, the temperature of spray drying of the high speed centrifugal spray drying tower and the temperature at the outlet are set to 230-380° C. and 60-85° C. respectively, and the moisture of kaolin powder is controlled in 3 wt. %-5 wt. %; and the intercalation reaction of the kaolin slurry is performed in the process that the powder passes through the packing auger, the elevator scoop and the bunker, and the kaolin product for paper coating is obtained after the intercalation reaction.

2. The process for producing a kaolin product for paper coating according to the claim 1, wherein the particulate grinding medium is ceramic spheres, glass beads, synthetic corundum spheres or nylonpolyethylene spheres.

* * * * *